(12) United States Patent
Liu

(10) Patent No.: US 12,244,978 B2
(45) Date of Patent: Mar. 4, 2025

(54) PURPLE-FRINGE CORRECTION METHOD AND PURPLE-FRINGE CORRECTION DEVICE

(71) Applicant: SAMSUNG ELECTRONICS CO., LTD., Suwon-si (KR)

(72) Inventor: Wenjuan Liu, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 472 days.

(21) Appl. No.: 17/509,729

(22) Filed: Oct. 25, 2021

(65) Prior Publication Data
US 2023/0093967 A1 Mar. 30, 2023

(30) Foreign Application Priority Data

Sep. 26, 2021 (CN) .......................... 202111128211.X

(51) Int. Cl.
| H04N 9/64 | (2023.01) |
|---|---|
| G06T 7/44 | (2017.01) |
| H04N 1/58 | (2006.01) |
| H04N 25/61 | (2023.01) |
| H04N 25/611 | (2023.01) |

(52) U.S. Cl.
CPC ............... *H04N 9/646* (2013.01); *G06T 7/44* (2017.01); *H04N 1/58* (2013.01); *H04N 25/61* (2023.01); *G06T 2207/20182* (2013.01); *H04N 25/611* (2023.01)

(58) Field of Classification Search
CPC .. H04N 25/61; H04N 25/615; H04N 25/6153; H04N 9/646; H04N 1/58; H04N 25/611; H04N 23/843; H04N 23/84; G06T 7/44; G06T 2207/20182

USPC .......................................................... 348/242
See application file for complete search history.

(56) References Cited

U.S. PATENT DOCUMENTS

| 7,529,405 | B2 | 5/2009 | Masuno et al. | |
|---|---|---|---|---|
| 7,577,292 | B2 | 8/2009 | Kang | |
| 8,339,462 | B2 | 12/2012 | Stec et al. | |
| 2006/0098253 | A1* | 5/2006 | Masuno | H04N 1/6027 358/518 |
| 2007/0035641 | A1* | 2/2007 | Yamada | H04N 23/843 348/241 |
| 2013/0039573 | A1 | 2/2013 | Choi et al. | |

(Continued)

FOREIGN PATENT DOCUMENTS

| CN | 1774031 A | 5/2006 |
|---|---|---|
| CN | 107864365 A | 3/2018 |

(Continued)

OTHER PUBLICATIONS

Chinese Office Action dated Jan. 27, 2024, cited in corresponding application CN Patent Application No. 202111128211.X.

*Primary Examiner* — Lin Ye
*Assistant Examiner* — Chan T Nguyen
(74) *Attorney, Agent, or Firm* — Fish & Richardson P.C.

(57) ABSTRACT

A purple-fringe correction method includes determining: (1) a first distance between a first pixel in a purple-fringe area in an image and an overexposed area in the image and (2) a second distance between the first pixel and a non-overexposed, non-purple-fringe area in the image. The first pixel in the purple-fringe area is corrected based on the first distance and the second distance.

17 Claims, 4 Drawing Sheets

(56) References Cited

U.S. PATENT DOCUMENTS

| | | | | |
|---|---|---|---|---|
| 2013/0272605 A1* | 10/2013 | Saito | ................... | H04N 23/843 |
| | | | | 382/167 |
| 2015/0036927 A1* | 2/2015 | Kang | ................... | H04N 9/646 |
| | | | | 382/167 |
| 2016/0171663 A1* | 6/2016 | Kim | ................... | H04N 25/611 |
| | | | | 382/167 |

FOREIGN PATENT DOCUMENTS

| | | | |
|---|---|---|---|
| CN | 112887693 A | | 6/2021 |
| JP | 2006-115039 A | | 4/2006 |
| JP | 2006005039 | * | 4/2006 |
| KR | 101160956 B1 | | 6/2012 |
| KR | 2013-0000537 A | | 1/2013 |
| KR | 101228333 B1 | | 1/2013 |
| KR | 101233986 B1 | | 2/2013 |

* cited by examiner

PURPLE-FRINGE CORRECTION METHOD AND PURPLE-FRINGE CORRECTION DEVICE

TECHNICAL FIELD

The present disclosure relates to image processing, and more specifically, to a purple-fringe correction method and a purple-fringe correction device.

BACKGROUND ART

In the imaging process, pseudo color areas will appear at the junction of overexposed areas and normal exposure areas due to lens color difference, imaging device crosstalk and color interpolation. Generally, this pseudo color area presents purple, which is called a purple-fringe, but the color of pseudo color may also be green according to different lens and shooting conditions. Hereinafter, the purple-fringe generally refers to these pseudo color areas. The appearance of this false color area will have a negative impact on the image quality, so how to eliminate the purple-fringe is a problem to be solved.

SUMMARY

This Summary is provided to introduce a selection of concepts in a simplified form that are further described below in the Detailed Description. A purple-fringe correction method and a purple-fringe correction device are disclosed.

In one general aspect, a purple-fringe correction method includes determining: (1) a first distance between a first pixel in a purple-fringe area in an image and an overexposed area in the image and (2) a second distance between the first pixel and a non-overexposed, non-purple-fringe area in the image. The first pixel is corrected in the purple-fringe area based on the first distance and the second distance.

In another general aspect, a non-transitory computer-readable storage medium is disclosed. The non-transitory computer-readable storage medium stores instructions, which when executed by a processor, implements the purple-fringe correction method described above.

In another general aspect, a purple-fringe correction device includes a processor and a memory that stores instructions executable in the processor. When the instructions are executed in the processor, the processor determines: (1) a first distance between a first pixel in a purple-fringe area in an image and an overexposed area in the image and (2) a second distance between the first pixel and a non-overexposed, non-purple-fringe area in the image. The processor corrects the first pixel in the purple-fringe area based on the first distance and the second distance.

In another general aspect, an electric device includes a camera that captures an image and a processor that determines: (1) a first distance between a first pixel in a purple-fringe area in the image and an overexposed area in the image and (2) a second distance between the first pixel and a non-overexposed, non-purple-fringe area in the image. The processor corrects the first pixel in the purple-fringe area based on the first distance and the second distance.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples and are not limited to those set forth herein but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Figure 1:
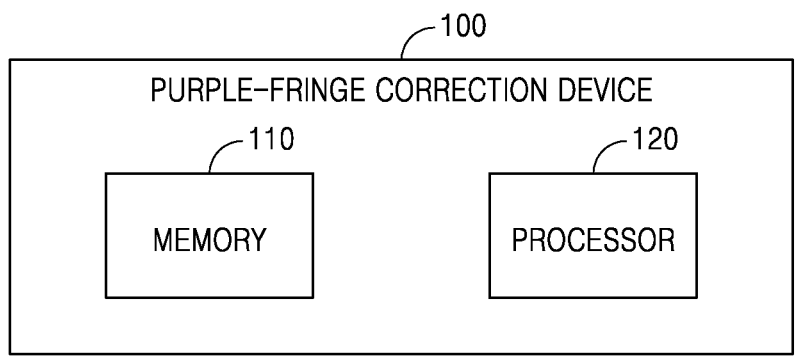
FIG. 1 is a block diagram showing a purple-fringe correction device according to an example embodiment.

FIG. 1 is a block diagram showing a purple-fringe correction device according to an example embodiment.

Referring to FIG. 1, the purple-fringe correction device 100 may include a memory 110 and a processor 120. Although not shown in FIG. 1, the purple-fringe correction device 100 may be connected to an external memory and/or communicate with an external device. The purple-fringe correction device 100 shown in FIG. 1 may include components associated with the current example. Therefore, it will be clear to those skilled in the art that the purple-fringe correction device 100 may further include other general components in addition to the components shown in FIG. 1.

Here, the purple-fringe correction device 100 may be implemented in various types of devices such as a personal computer (PC), a server device, a mobile device, an embedded device, and the like. In detail, the purple-fringe correction device 100 may be included in a smart phone, a tablet device, an augmented reality (AR) device, an Internet of Things (IoT) device, an autonomous vehicle, a robotic device, or a medical device that may capture images and/or process images but is not limited thereto.

The memory 110 stores various data processed in the purple-fringe correction device 100. For example, the memory 110 may store data processed or to be processed in the purple-fringe correction device 100. In one example, the memory may store instructions executable in the processor 120. In addition, the memory 110 may store an application or a driver to be driven by the purple-fringe correction device 100.

For example, the memory 110 may include random access memory (RAM) (such as dynamic random access memory (DRAM) or static random access memory (SRAM)), read only memory (RAM), electrically erasable programmable read only memory (EEPROM), CD-ROM, Blu ray disc, optical disc storage device, hard disk drive (HDD), solid state drive (SSD), or flash memory.

The processor 120 may control the overall functions of the purple-fringe correction device 100. For example, the processor 120 may generally control the purple-fringe correction device 100 by executing a program stored in the memory 110. The processor 120 may be implemented as a central processing unit (CPU), a graphics processing unit (GPU), or an application processor (AP) included in the purple-fringe correction device 100 but is not limited thereto.

The processor 120 may read data (e.g., image data) from or write data (e.g., image data) to the memory 110 and perform purple-fringe correction by using the read data/written data. For example, when the instruction is executed in the processor, the processor is configured to determine: (1) a first distance between: (a) a first pixel in a purple-fringe area in an image and (b) an overexposed area in the image and (2) a second distance between: (c) the first pixel and (d) a non-overexposed, non-purple-fringe area in the image. The processor may correct the first pixel in the purple-fringe area based on the first distance and the second distance.

That is to say, the purple-fringe correction device 100 may adaptively correct the pixels in the purple-fringe area based on the distance between the pixel and the overexposed area and the distance between the pixel and the non-overexposed, non-purple-fringe area. Therefore, even in the face of complex purple-fringes (e.g., purple-fringes of different shapes), the purple-fringe correction device 100 may effectively correct the purple-fringes.

Hereinafter, an example of the purple-fringe correction method performed by the processor 120 will be described with reference to FIGS. 2 to 7.

Figure 2:
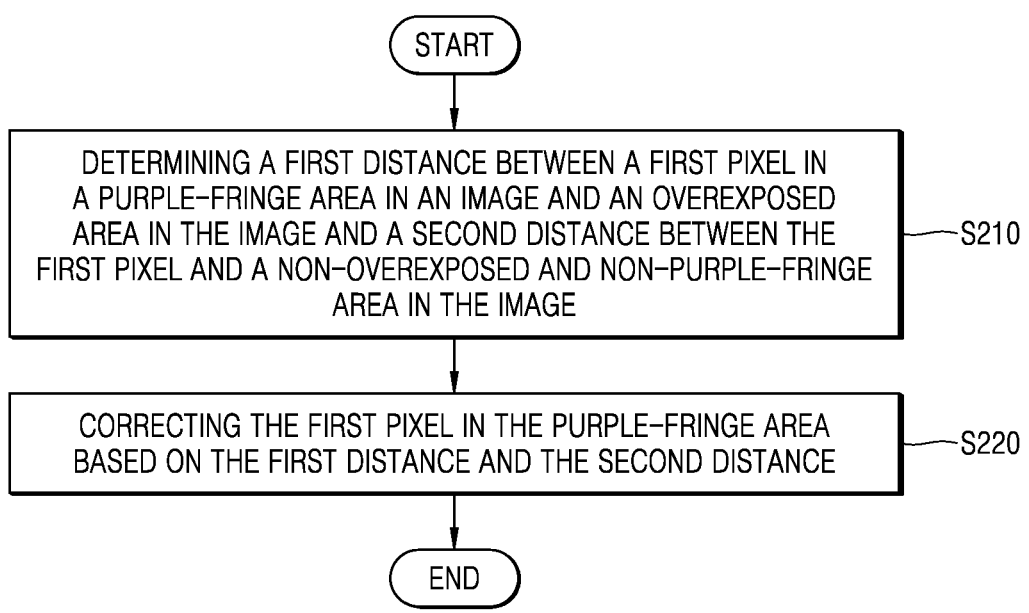
FIG. 2 is a flowchart showing a purple-fringe correction method according to an example embodiment.

FIG. 2 is a flowchart showing a purple-fringe correction method according to an example embodiment.

Referring to FIG. 2, in operation S210, the processor may determine: (1) a first distance between a first pixel in a purple-fringe area in an image and an overexposed area in the image and (2) a second distance between the first pixel and a non-overexposed, non-purple-fringe area in the image.

Here, the purple-fringe area may be determined in advance. The purple-fringe area may be predetermined using various methods. For example, the purple-fringe area may be determined according to at least one of colors of pixels in the image, edges in the image, and brightness of the pixels in the image. However, the present disclosure is not limited to thereto and in other examples any other method may be used to determine the purple-fringe area in advance.

In addition, overexposed areas and non-overexposed, non-purple-fringe areas may be determined in advance. Overexposed areas and non-overexposed, non-purple-fringe areas may be predetermined using various methods. For example, the overexposed area and the non-overexposed, non-purple-fringe area may be determined according to the brightness of the pixels in the image. However, the present disclosure is not limited thereto and in other examples any other method may be used to predetermine the overexposed area and the non-overexposed, non-purple-fringe area. For example, the overexposed area and the non-overexposed, non-purple-fringe area may be determined while limiting the number of pixels in the overexposed area. In one example, the processor may preprocess the image (e.g., noise reduction) before determining the overexposed area and the non-overexposed, non-purple-fringe area.

In one embodiment, the first pixel may be a pixel at a predetermined position in each of a plurality of areas divided from the purple-fringe area. For example, the first pixel may be or may include a plurality of pixels that are not adjacent. Here, the plurality of non-adjacent pixels may be a plurality of pixels which are evenly distributed or a plurality of pixels which are unevenly distributed. The disclosure does not limit the distribution mode of the plurality of pixels. In one example, the predetermined location may include the center of the area. However, the above example is only exemplary, and the predetermined position of the present disclosure is not limited thereto. Areas may be divided in any way. For example, areas may be divided into rectangles. However, the above example is only exemplary and the shape of the area of the present disclosure is not limited thereto.

In operation S210, the first distance between the first pixel and the overexposed area may indicate the level of the distance between the first pixel and the overexposed area. For example, the first distance may be the shortest distance between the first pixel and the overexposed area. However, the present disclosure is not limited thereto. For example, the first distance may be an average of a plurality of distances between a predetermined number of pixels, closest to the first pixel, in the overexposed area and the first pixel. It is noted that the above example is only exemplary, and the first distance indicating the level of the distance between the first pixel and the overexposed area may be specifically defined according to situations.

Similarly, the second distance of the first pixel from the non-overexposed, non-purple-fringe area may indicate the level of the distance of the first pixel from the non-overexposed, non-purple-fringe area. For example, the second distance may be the shortest distance between the first pixel and the non-overexposed, non-purple-fringe area. However, the present disclosure is not limited thereto. For example, the second distance may be an average of a plurality of distances between a predetermined number of pixels, closest to the first pixel, in a non-overexposed and non-purple-fringe area and the first pixel. It is noted that the above example is only exemplary, and the second distance indicating the level of the distance between the first pixel and the non-overexposed and non-purple-fringe area may be defined similarly to the first distance according to situations.

In addition, the first pixel may be a single pixel or a plurality of pixels. When the first pixel is a plurality of pixels, the corresponding first distance and second distance may be determined for each pixel.

In operation S220, the processor may correct the first pixel in the purple-fringe area based on the first distance and the second distance.

In one example, when the first pixel is a plurality of pixels, the processor may correct each pixel based on the first distance and the second distance of each pixel, respectively.

In one embodiment, the processor may first determine the first weight of the first pixel in the purple-fringe area based on the first distance and the second distance, wherein the first weight is greater than or equal to 0 and less than or equal to 1. Then, the processor may change at least one pixel data of the first pixel based on the first weight of the first pixel, thereby correcting the first pixel. The at least one pixel data may include pixel data within at least one color domain of one or more color domains (such as, but not limited to, UV domain, CrCb domain, and/or HS domain).

Here, the first weight of the first pixel may indicate the level to which the first pixel is close to the non-overexposed, non-purple-fringe area relative to the overexposed area, that is, how close the first pixel is to the non-overexposed, non-purple-fringe area relative to the overexposed area. For example, as an exemplary example only, the processor may calculate a ratio between the second distance and the sum of the first distance and the second distance as the first coefficient and determine the first weight of the first pixel by mapping the first coefficient to a first predetermined mapping curve. The greater the first coefficient, the greater the first weight of the first pixel. In other words, the higher the level to which the first pixel is close to the non-overexposed, non-purple-fringe area relative to the overexposed area, the greater the first weight.

In one example, the first predetermined mapping curve may ensure that when the first coefficient is 0, the first weight is 0; and when the first coefficient is 1, the first weight is 1. However, the above examples are only exemplary, and the present disclosure is not limited thereto. An appropriate mapping curve may be selected as the first predetermined mapping curve as required. For example, the first predetermined mapping curve may be a linear curve or a nonlinear curve.

In a particular case, the processor may set the first coefficient as 1. For example, as an exemplary example only, when the sum of the first distance and the second distance is less than a first threshold, the processor may set the first coefficient as 1. It may be considered that the first pixel is in an area, adjacent to the overexposed area and the non-overexposed and non-purple-fringe area, in the purple-fringe area.

Figure 3:
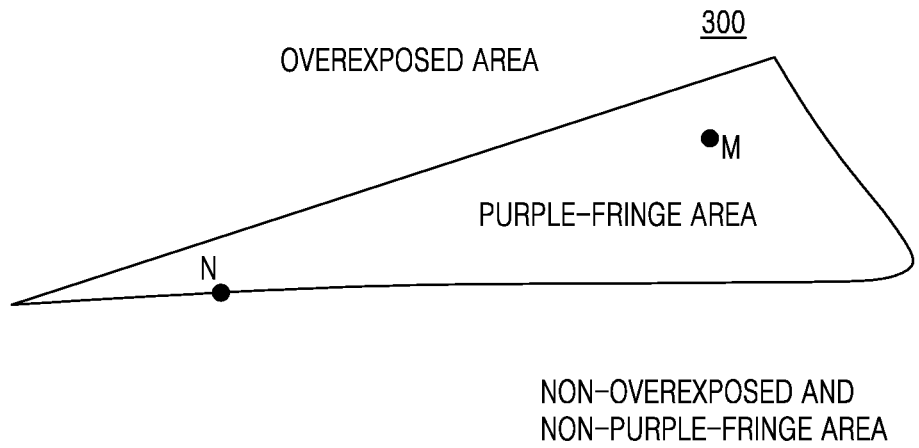
FIG. 3 is a schematic diagram showing an image according to an example embodiment.

FIG. 3 is a schematic diagram showing an image according to an example embodiment.

Referring to FIG. 3, the image 300 may include three areas (i.e., as an example only, the overexposed area in the upper left corner, the middle purple-fringe area, and the remaining non-overexposed and non-purple-fringe area).

Generally, the shape and size of the purple-fringe area may vary greatly. For example, the shape of the purple-fringe area may be an irregular polygon, an irregular ellipse, or any other shape. In this case, it is often difficult to distinguish some pixels in the purple-fringe area and correct them effectively.

Specifically, referring to FIG. 3, the purple-fringe area may include a pixel (or a pixel point) N located on the edge between the non-overexposed, non-purple-fringe area and the purple-fringe area and a pixel M located in the purple-fringe area. For example, a first distance Nd1 from the pixel N to the overexposed area and a first distance Md1 from the pixel M to the overexposed area are the same (for example, the difference between the first distance Nd1 and the first distance Md1 is less than a predetermined threshold), while a second distance Nd2 from the pixel N to the non-overexposed, non-purple-fringe area and a second distance Md2 from the pixel M to the non-overexposed, non-purple-fringe area are different (for example, the difference between the second distance Nd2 and the second distance Md2 is greater than or equal to a predetermined threshold).

According to an exemplary embodiment of the present disclosure, the processor may correct the pixel N and the pixel M differently, so as to effectively correct the pixel N and the pixel M for the circumstance in which that the pixel N and the pixel M are distinguished based on the first distance and the second distance. In this case, pixel N and the pixel M may have different first weights.

Similarly, according to an exemplary embodiment of the present disclosure, when: (1) the first distance Nd1 from the pixel N to the overexposed area and the first distance Md1 from the pixel M to the overexposed area are different (for example, the difference between the first distance Nd1 and the first distance Md1 is greater than or equal to a predetermined threshold) and (2) the second distance Nd2 from the pixel N to the non-overexposed, non-purple-fringe area is the same as the second distance Md2 from the pixel M to the non-overexposed, non-purple-fringe area (for example, the difference between the second distance Nd2 and the second distance Md2 is less than a predetermined threshold), the processor may correct the pixel N and the pixel M differently. Thus, the pixel N and the pixel M are effectively corrected in the circumstance in which the pixel N and the pixel M are distinguished based on the first distance and the second distance. In this case, the pixel N and the pixel M may have different first weights.

In other words, in the case that the first pixel includes a plurality of pixels, when the first distance of one pixel in the plurality of pixels is the same as the first distance of another pixel in the plurality of pixels and the second distance of the one pixel is different from the second distance of the another pixel, the one pixel and the another pixel are corrected differently; and/or when the first distance of one pixel in the plurality of pixels is different from the first distance of another pixel in the plurality of pixels and the second distance of the one pixel is the same as the second distance of the another pixel, the one pixel and the other pixel are corrected differently.

Therefore, according to the embodiment of the present disclosure, the processor may effectively distinguish and effectively correct the pixels.

Figure 4:
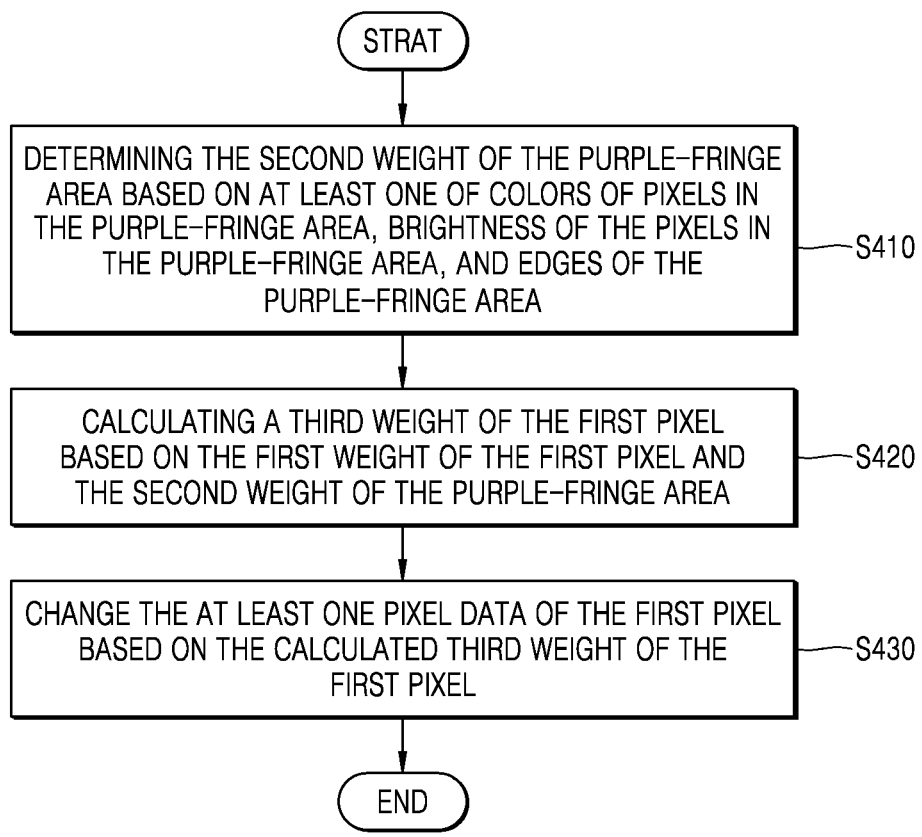
FIG. 4 is a flowchart showing a method of changing a first weight of a first pixel according to an example embodiment.

FIG. 4 is a flowchart showing a method of changing the first weight of the first pixel according to an example embodiment.

Referring to FIG. 4, in operation S410, the processor may determine a second weight of the purple-fringe area based on the colors of the pixels in the purple-fringe area, the brightness of the pixels in the purple-fringe area, or the edges of the purple-fringe area.

The second weight may indicate the overall purple degree of the purple-fringe area. For example, when the second weight is greater, the overall purple degree of the purple area is greater.

In one example, the colors of the pixels in the purple-fringe area may indicate the purple degrees of the pixels, so the processor may determine the second weight of the purple-fringe area based on the purple degrees of the pixels in the purple-fringe area. For example, the processor may determine the purple degrees of the pixels according to whether the pixels meet the threshold condition in the color domain. In another example, since the purple-fringe area is usually more likely to appear in the brighter area, the brightness of the pixels in the purple-fringe area may be compared with a predetermined threshold to determine the second weight of the purple-fringe area based on the brightness of the pixels. In another example, the processor may determine the second weight of the purple-fringe area based on the gradients of the edges of the purple-fringe area.

In other words, the processor may determine the second weight of the purple-fringe area based on the purple degrees of the pixels in the purple-fringe area, the brightness of the pixels in the purple-fringe area, or the gradient degree of the edges of the purple-fringe area.

In operation S420, the processor may calculate a third weight of the first pixel based on the first weight of the first pixel and the second weight of the purple-fringe area.

As described above, the first weight of the first pixel may indicate the level to which the first pixel is close to the non-overexposed, non-purple-fringe area relative to the overexposed area and the second weight may indicate the overall purple degree of the purple-fringe area. Therefore, the third weight of the first pixel calculated based on the first weight of the first pixel and the second weight of the purple-fringe area may indicate both the level to which the first pixel is close to the non-overexposed, non-purple-fringe area relative to the overexposed area and the overall purple level or degree of the purple-fringe area.

In one embodiment, the processor may calculate the third weight of the first pixel as the product of the first weight of the first pixel and the second weight of the purple-fringe area, so that the third weight of the first pixel may indicate both the level to which the first pixel is close to the non-overexposed, non-purple-fringe area relative to the overexposed area and the overall purple degree of the purple-fringe area. However, the present disclosure is not limited thereto and it is also feasible to calculate the third weight of the first pixel based on the first weight of the first pixel and the second weight of the purple-fringe area in other ways, so as to obtain the third weight of the first pixel that may indicate both the level to which the first pixel is close to the non-overexposed, non-purple-fringe area relative to the overexposed area and the overall purple degree of the purple-fringe area.

In operation S430, the processor may change at least one pixel data of the first pixel based on the calculated third weight of the first pixel.

When the third weight may indicate both the level to which the first pixel is close to the non-overexposed and non-purple-fringe area relative to the overexposed area and the overall purple degree of the purple-fringe area, changing at least one pixel data of the first pixel based on the third weight may effectively correct at least one pixel data of the first pixel. This is because, in the process of correction, the processor considers both the level to which the first pixel is close to the non-overexposed and non-purple-fringe area relative to the overexposed area and the overall purple degree of the purple-fringe area.

In one embodiment, at least one pixel data of the first pixel may include a color component of the first pixel. In this case, the first value of the first pixel may be calculated by mapping the third weight of the first pixel to a second predetermined mapping curve. Here, the greater the third weight of the first pixel, the greater the first value of the first pixel. In other words, the second predetermined mapping curve may be a monotonically increasing curve. In a non-limiting example, the second predetermined mapping curve may be a linear curve. However, the disclosure is not limited thereto and other nonlinear curves are also feasible.

For example, taking only the UV domain as an example, the processor may obtain the corrected color component by the following equations:

$$U = U0 \times (1 - f(w)) \qquad (1)$$

$$V = V0 \times (1 - f(w)) \qquad (2)$$

Wherein U0 and V0 are the original U component and V component of the first pixel, w is the third weight, and f( ) corresponds to the second mapping curve.

That is, the corrected color component may be obtained by changing the color component of the first pixel to the product of the color component of the first pixel and the difference between 1 and the first value of the first pixel.

In another embodiment, the processor may calculate the second value of the first pixel by mapping the third weight of the first pixel to a third predetermined mapping curve. Here, the greater the third weight of the first pixel, the greater the second value of the first pixel. In other words, the third predetermined mapping curve may be a monotonically increasing curve. In a non-limiting example, the third predetermined mapping curve may be a linear curve. However, the disclosure not limited thereto and other nonlinear curves are also feasible.

In this embodiment, the processor may obtain: (1) a first color component (UA, VA) of a first reference point A at a first distance from the first pixel in the overexposed area, (2) a second color component (UB, VB) of the second reference point B at a second distance from the first pixel in the non-overexposed and non-purple-fringe area, and (3) a color component (U0, V0) of the first pixel. Then, the processor may calculate the difference between the first color component (UA, VA) and the second color component (UB, VB) as the color component difference DU=UA−UB, DV=VA−VB. Then, the processor may change the color component of the first pixel to the difference between the color component of the first pixel and the product of the color component difference and the second value of the first pixel by the following equations so as to correct the color component of the first pixel.

$$U = U0 - f(w) \times DU \qquad (3)$$

$$V = V0 - f(w) \times DV \qquad (4)$$

Wherein, U0 and V0 are the original U component and V component of the first pixel, w is the third weight, and f( ) corresponds to the third mapping curve.

Here, although the color component of the first pixel is described by taking the UV domain as an example, the disclosure is not limited thereto. The disclosure may also be applied to any other color domains (such as, but not limited to, CrCb domain and HS domain, etc.).

Since in the process of correction, the weight (the first weight and/or the third weight) of the pixel and the information of the reference point corresponding to the weight are used at the same time, it may be adapted to the purple-fringes of different shapes and reduce the influence of similar colors to effectively restore the color component of the pixels in the purple-fringes.

Figure 5:
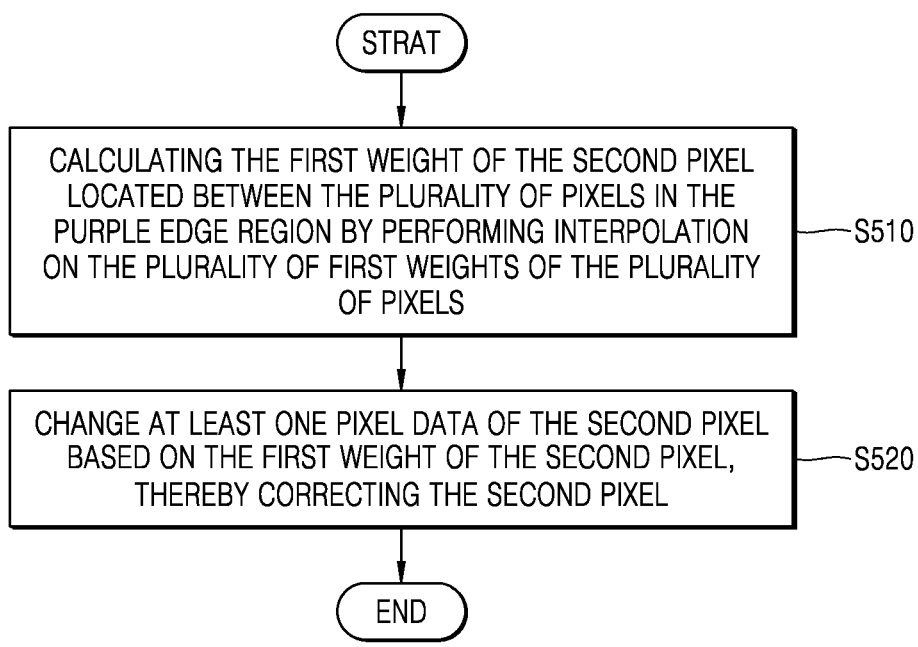
FIG. 5 is a flowchart showing a method of correcting a second pixel in the purple-fringe according to an example embodiment.

FIG. 5 is a flowchart showing a method of correcting the second pixel in the purple edge according to an example embodiment.

In FIG. 5, the second pixel may be a pixel among a plurality of non-adjacent pixels included in the first pixel. According to the embodiment, the information for changing the second pixel may be obtained by using the relevant information (e.g., the first weights) of the plurality of pixels included in the first pixel, without using the first distance and the second distance of the second pixel to calculate the information for changing the second pixel. Therefore, the amount of calculation is reduced and the time for correcting the purple edge region is reduced.

More specifically, referring to FIG. 5, in operation S510, the processor may calculate the first weight of the second pixel located among the plurality of pixels in the purple edge region by performing interpolation on the plurality of first weights of the plurality of pixels.

Here, the processor may perform interpolation using various interpolation algorithms. For example, various interpolation algorithms include, but are not limited to, nearest neighbor interpolation, bilinear interpolation, and/or cubic convolution interpolation. Further, the first weight of each of the plurality of pixels included in the first pixel may be determined based on the purple edge correction method described with reference to FIG. 4.

In operation S520, the processor may change at least one pixel data of the second pixel based on the first weight of the second pixel, thereby correcting the second pixel.

Here, the method of changing at least one pixel data of the second pixel in operation S520 may be basically the same as the method of changing at least one pixel data of the first pixel described with reference to FIG. 4. Therefore, the method of changing at least one pixel data of the second pixel in operation S520 will be briefly described below, and the method of changing at least one pixel data of the first pixel described with reference to FIG. 4 may be similarly applied to operation S520.

In one embodiment, the processor may first determine a second weight of the purple edge region based on the colors of the pixels in the purple edge region, the brightness of the pixels in the purple edge region, or the edges of the purple edge region, wherein the second weight is greater than or equal to 0 and less than or equal to 1. Then, the processor calculates the third weight of the second pixel based on the first weight of the second pixel and the second weight of the purple edge region. Finally, the processor may change at least one pixel data of the second pixel based on the calculated third weight of the second pixel.

In this embodiment, when at least one pixel data of the second pixel includes the color component of the second pixel, the processor may calculate the first value of the second pixel by mapping the third weight of the second pixel to the second predetermined mapping curve, wherein the greater the third weight of the second pixel, the greater the first value of the second pixel. Next, the corrected second pixel may be obtained by changing the color component of the second pixel to the product of the color component of the second pixel and the difference between 1 and the first value of the second pixel.

Figure 6:
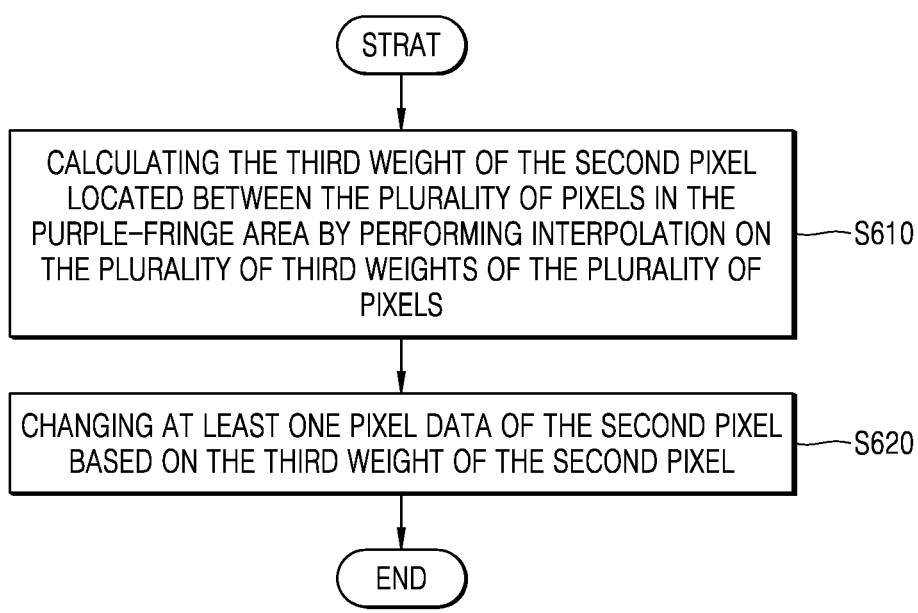
FIG. 6 is a flowchart showing a method of correcting a second pixel in the purple-fringe according to an example embodiment.

FIG. 6 is a flowchart showing a method of correcting the second pixel in the purple-fringe according to an example embodiment.

In FIG. 6, the second pixel may be a pixel among a plurality of pixels which are non-adjacent. According to an embodiment, the processor may use the relevant information (e.g., the third weights) of the plurality of pixels to obtain the information for changing the second pixel without using the first distance and the second distance of the second pixel to calculate the information for changing the second pixel, and therefore, the amount of calculation is reduced and the time for correcting the purple-fringe area is reduced.

More specifically, referring to FIG. 6, in operation S610, the processor may calculate the third weight of the second pixel located among the plurality of pixels in the purple-fringe area by performing interpolation on the plurality of third weights of the plurality of pixels.

Here, the processor may perform interpolation using various interpolation algorithms. For example, various interpolation algorithms include, but are not limited to, nearest neighbor interpolation, bilinear interpolation, and/or cubic convolution interpolation. In addition, the third weight of each of the plurality of pixels may be determined based on the purple-fringe correction method described with reference to FIG. 4.

In operation S620, the processor may change at least one pixel data of the second pixel based on the third weight of the second pixel, thereby correcting the second pixel.

Here, the method of changing at least one pixel data of the second pixel in operation S620 may be substantially the same as the method of changing at least one pixel data of the first pixel described with reference to FIG. 4. Therefore, in order to be concise, the method of changing at least one pixel data of the second pixel in operation S620 will be briefly described below, and the method of changing at least one pixel data of the first pixel described with reference to FIG. 4 may also be similarly applied to operation S620.

In one embodiment, at least one pixel data of the second pixel may include a color component of the second pixel. The processor may calculate the first value of the second pixel by mapping the third weight of the second pixel to the second predetermined mapping curve, wherein the greater the third weight of the second pixel, the greater the first value of the second pixel. Then, the processor may correct the color component of the second pixel by changing the color component of the second pixel to the product of the color component of the second pixel and the difference between 1 and the first value of the second pixel.

Figure 7:
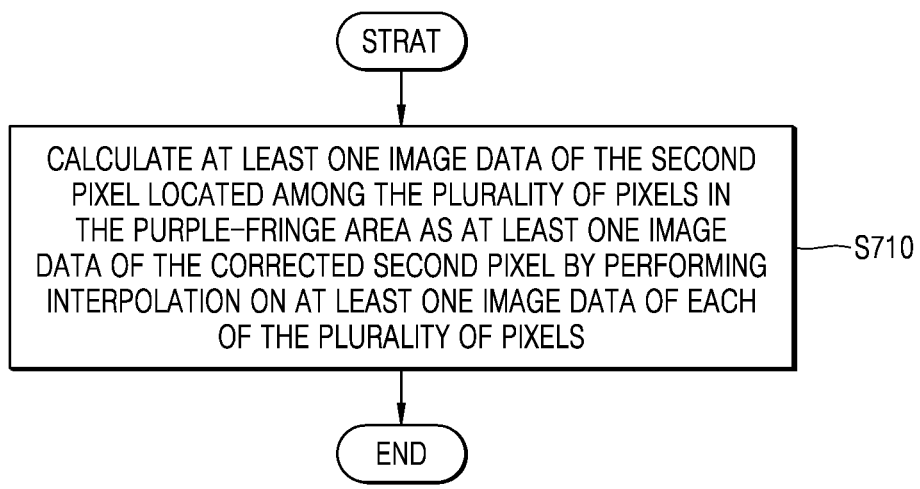
FIG. 7 is a flowchart showing a method of correcting a second pixel in the purple-fringe according to an example embodiment.

FIG. 7 is a flowchart showing a method of correcting the second pixel in the purple-fringe according to an example embodiment.

In FIG. 7, the second pixel may be a pixel among a plurality of pixels which are non-adjacent. According to an embodiment, the processor may use the relevant information (e.g., image data) of the plurality of pixels to obtain the information for changing the second pixel without using the first distance and the second distance of the second pixel to calculate the information for changing the second pixel. Therefore, the amount of calculation is reduced and the time for correcting the purple-fringe area is reduced.

In operation S710, the processor may calculate at least one image data of the second pixel located among the plurality of pixels in the purple-fringe area as at least one image data of the corrected second pixel by performing interpolation on at least one image data of each of the plurality of pixels.

In other words, the processor may correct the image data of other pixels (e.g., the second pixel) by using the corrected image data of the plurality of pixels.

Figure 8:
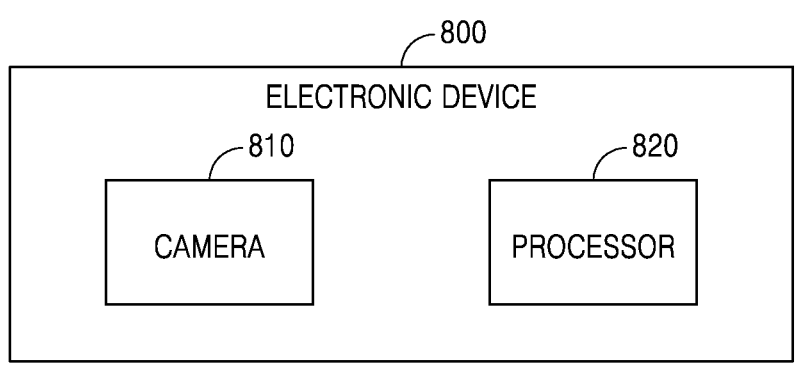
FIG. 8 is a block diagram showing an electronic device according to an example embodiment.

FIG. 8 is a block diagram showing an electronic device according to an example embodiment.

Referring to FIG. 8, the electronic device 800 may include a camera 810 and a processor 820. For example, the electronic device 800 may be applied to or installed in robotic devices (such as unmanned aircraft and an advanced driver assistance system (ADAS)), smart TVs, smart phones, medical devices, mobile devices, image display devices, measuring devices, IoT devices, and any other various types of electronic devices.

The camera 800 may capture images. The processor 820 may perform operations similar to those performed by the processor 120 described with reference to FIG. 1. For example, the processor 820 may receive an image and determine: (1) the first distance between the first pixel in the purple-fringe area in the image and the overexposed area in the image and (2) the second distance between the first pixel and the non-overexposed, non-purple-fringe area in the image. The processor 820 may correct the first pixel in the purple-fringe area based on the first distance and the second distance.

One or more of the methods described above may be written as a program executable on a computer and may be implemented on a general-purpose digital computer operating the program by using a non-transitory computer-readable recording medium. Various devices may be used to record the structure of the data used in the above method on a computer-readable recording medium. The computer-readable recording medium may include a storage medium, such as a magnetic storage medium (e.g., ROM, RAM, universal serial bus (USB), floppy disk, hard disk, etc.), an optical recording medium (e.g., optical disc (CD)-ROM, digital universal optical disc (DVD), etc.), and the like.

According to an embodiment, since the pixels in the purple-fringe area may be adaptively corrected based on the distance between the pixel and the overexposed area and the distance between the pixel and the non-overexposed and non-purple-fringe area, the purple-fringe may be effectively corrected even for complex purple-fringes (e.g., purple-fringes of different shapes).

According to an embodiment, since the pixel N and the pixel M (for example, the pixel N and the pixel M with the same first distance but different second distances, or the pixel N and the pixel M with different first distances but the same second distance) may be distinguished based on the first distance and the second distance, the seemingly indistinguishable pixel N and the pixel M may be effectively distinguished, and the seemingly indistinguishable pixel N and pixel M may be effectively corrected.

According to an embodiment, since both: (1) the level to which the first pixel is close to the non-overexposed and non-purple-fringe area relative to the overexposed area and (2) the overall purple degree of the purple-fringe area are considered in the correction process, at least one pixel data of the first pixel may be effectively corrected.

According to an embodiment, the information for changing the second pixel may be obtained by using the relevant information (e.g., the first weights) of a plurality of pixels, without using the first distance and the second distance of the second pixel to calculate the information for changing the second pixel. Therefore, the amount of calculation is reduced and the time for correcting the purple-fringe area is reduced.

According to an embodiment, the information for changing the second pixel may be obtained by using the relevant information (e.g., the third weights) of a plurality of pixels, without using the first distance and the second distance of the second pixel to calculate the information for changing the second pixel. Therefore, the amount of calculation is reduced and the time for correcting the purple-fringe area is reduced.

According to an embodiment, the information for changing the second pixel may be obtained by using the relevant information (e.g., image data) of a plurality of pixels, without using the first distance and the second distance of the second pixel to calculate the information for changing the second pixel. Therefore, the amount of calculation is reduced and the time for correcting the purple-fringe area is reduced.

According to an embodiment, since the weight of the pixel (the first weight and/or the third weight) and the information of the reference point corresponding to the weight are used simultaneously in the process of correction, the purple-fringes of different shapes may be adapted and the influence of similar colors may be reduced to effectively recover the color component of the pixel in the original purple-fringe.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A purple-fringe correction method for correcting pixels of a purple-fringe area of an image, the purple-fringe area interposed between an overexposed area and a non-overexposed non-purple-fringe area of the image, comprising:
   determining
      a first distance from a first pixel of a plurality of pixels in the purple-fringe area to the overexposed area, and
      a second distance from the first pixel to the non-overexposed non-purple-fringe area; and
   correcting the first pixel based on a relationship between the first distance and the second distance,
   wherein when the first distance of one first pixel of the plurality of pixels is the same as the first distance of another first pixel of the plurality of pixels and the second distance of the one first pixel is the different from the second distance of the other first pixel of the plurality of pixels, the one first pixel is corrected differently from the other first pixel; and/or wherein when the first distance of the one first pixel is different from the first distance of the other first pixel and the second distance of the one first pixel is the same as the second distance of the other first pixel of the plurality of pixels, the one first pixel is corrected differently from the other first pixel.

2. The purple-fringe correction method of claim 1, wherein the correcting the first pixel in the purple-fringe area comprises:
   determining a first weight of the first pixel based on the relationship between the first distance and the second distance, wherein the first weight is greater than or equal to 0 and less than or equal to 1; and
   changing a pixel value of the first pixel based on the first weight of the first pixel.

3. The purple-fringe correction method of claim 2, wherein the determining the first weight of the first pixel comprises:
   calculating a ratio between the second distance and a sum of the first distance and the second distance as a first coefficient, wherein when the sum of the first distance and the second distance is less than a first threshold, the first coefficient is 1; and
   determining the first weight of the first pixel by mapping the first coefficient to a predetermined mapping curve, wherein the greater the first coefficient, the greater the first weight of the first pixel.

4. The purple-fringe correction method of claim 2, wherein the changing the pixel value of the first pixel comprises:
   determining a second weight of the purple-fringe area based on at least one of colors of pixels in the purple-fringe area, brightness of the pixels in the purple-fringe area, and edges of the purple-fringe area, wherein the second weight is greater than or equal to 0 and less than or equal to 1;
   calculating a third weight of the first pixel based on the first weight of the first pixel and the second weight of the purple-fringe area; and
   changing the pixel value of the first pixel based on the third weight of the first pixel.

5. The purple-fringe correction method of claim 4, wherein the calculating the third weight of the first pixel comprises calculating the third weight of the first pixel as a product of the first weight of the first pixel and the second weight of the purple-fringe area.

6. The purple-fringe correction method of claim 4, wherein:
   the pixel value of the first pixel comprises a color component of the first pixel,
   the changing the pixel value of the first pixel comprises:
   calculating a first value of the first pixel by mapping the third weight of the first pixel to a predetermined mapping curve, wherein the greater the third weight of the first pixel, the greater the first value of the first pixel; and
   changing the color component of the first pixel based on a product of the color component of the first pixel and a difference between 1 and the first value of the first pixel.

7. The purple-fringe correction method of claim 4, wherein:
   the pixel value of the first pixel comprises a color component of the first pixel, and
   the changing the pixel value of the first pixel comprises:
   calculating a second value of the first pixel by mapping the third weight of the first pixel to a predetermined mapping curve, wherein the greater the third weight of the first pixel, the greater the second value of the first pixel;
   obtaining a first color component of a first reference point, at the first distance from the first pixel, in the overexposed area, a second color component of a second reference point, at the second distance from the first pixel, in the non-overexposed and non-purple-fringe area, and the color component of the first pixel;
   calculating a difference between the first color component and the second color component as a color component difference; and
   changing the color component of the first pixel based on the difference between the color component of the first pixel and a product of the color component difference and the second value of the first pixel.

8. The purple-fringe correction method of claim 4, wherein:
   the method further comprises:
   calculating a third weight of a second pixel among the plurality of pixels in the purple-fringe area by interpolating a plurality of third weights of the plurality of pixels; and
   changing a pixel value of the second pixel based on the third weight of the second pixel.

9. The purple-fringe correction method of claim 8, wherein:
   the pixel value of the second pixel comprises a color component of the second pixel,
   the changing the pixel value of the second pixel comprises:
   calculating a first value of the second pixel by mapping the third weight of the second pixel to a predetermined mapping curve, wherein the greater the third weight of the second pixel, the greater the first value of the second pixel; and
   changing the color component of the second pixel based on a product of the color component of the second pixel and a difference between 1 and the first value of the second pixel.

10. The purple-fringe correction method of claim 4, wherein the determining the second weight of the purple-fringe area comprises determining the second weight of the purple-fringe area based on at least one of purple degrees of pixels in the purple-fringe area, brightness degrees of the pixels in the purple-fringe area, and gradients of edges of the purple-fringe area.

11. The purple-fringe correction method of claim 2, further comprising:
    calculating a first weight of a second pixel among the plurality of pixels in the purple-fringe area by interpolating a plurality of first weights of the plurality of pixels; and
    changing a pixel value of the second pixel based on the first weight of the second pixel.

12. The purple-fringe correction method of claim 11, wherein the changing the pixel value of the second pixel comprises:
    determining a second weight of the purple-fringe area based on at least one of colors of pixels in the purple-fringe area, brightness of the pixels in the purple-fringe area, and edges of the purple-fringe area, wherein the second weight is greater than or equal to 0 and less than or equal to 1;
    calculating a third weight of the second pixel based on the first weight of the second pixel and the second weight of the purple-fringe area; and changing the pixel value of the second pixel based on the third weight of the second pixel.

13. The purple-fringe correction method of claim 12, wherein:
the pixel value of the second pixel comprises a color component of the second pixel,
the changing the pixel value of the second pixel comprises:
calculating a first value of the second pixel by mapping the third weight of the second pixel to a predetermined mapping curve, wherein the greater the third weight of the second pixel, the greater the first value of the second pixel; and
changing the color component of the second pixel based on a product of the color component of the second pixel and a difference between 1 and the first value of the second pixel.

14. The purple-fringe correction method of claim 2, further comprising calculating an image value of a second pixel among the plurality of pixels in the purple-fringe area by interpolating image values of the plurality of pixels.

15. A non-transitory computer-readable storage medium storing instructions, which, when executed by a processor, implements the purple-fringe correction method of claim 1.

16. A purple-fringe correction device for correcting pixels of a purple-fringe area of an image, the purple-fringe area interposed between an overexposed area and a non-overexposed non-purple-fringe area of the image, comprising:
a processor; and
a memory that stores instructions executable in a processor, wherein:
when the instructions are executed in the processor, the processor:
determines a first distance from a first pixel in the purple-fringe area to the overexposed area in the image, and a second distance from the first pixel to the non-overexposed non-purple-fringe area; and
corrects the first pixel in the purple-fringe area based on a relationship between the first distance and the second distance,
wherein correction of the first pixel in the purple-fringe area comprises:
determining a first weight of the first pixel based on the relationship between the first distance and the second distance, wherein the first weight is greater than or equal to 0 and less than or equal to 1; and
changing a pixel value of the first pixel based on the first weight of the first pixel, and
wherein the determining the first weight of the first pixel comprises:
calculating a ratio between the second distance and a sum of the first distance and the second distance as a first coefficient, wherein when the sum of the first distance and the second distance is less than a first threshold, the first coefficient is 1; and
determining the first weight of the first pixel by mapping the first coefficient to a predetermined mapping curve, wherein the greater the first coefficient, the greater the first weight of the first pixel.

17. An electric device, comprising:
a camera configured to capture an image; and
a processor configured to correct pixels of a purple-fringe area of the image, the purple-fringe area interposed between an overexposed area and a non-overexposed non-purple-fringe area of the image, wherein the processor:
determines a first distance from a first pixel in the purple-fringe area to the overexposed area in the image, and a second distance from the first pixel to the non-overexposed non-purple-fringe area; and
corrects the first pixel in the purple-fringe area based on a relationship between the first distance and the second distance,
wherein correction of the first pixel in the purple-fringe area comprises:
determining a first weight of the first pixel based on the relationship between the first distance and the second distance, wherein the first weight is greater than or equal to 0 and less than or equal to 1; and
changing a pixel value of the first pixel based on the first weight of the first pixel, and
wherein the determining the first weight of the first pixel comprises:
calculating a ratio between the second distance and a sum of the first distance and the second distance as a first coefficient, wherein when the sum of the first distance and the second distance is less than a first threshold, the first coefficient is 1; and
determining the first weight of the first pixel by mapping the first coefficient to a predetermined mapping curve, wherein the greater the first coefficient, the greater the first weight of the first pixel.

* * * * *